United States Patent
Suga et al.

(10) Patent No.: US 6,821,203 B2
(45) Date of Patent: Nov. 23, 2004

(54) MUSICAL VIDEO GAME SYSTEM, AND COMPUTER READABLE MEDIUM HAVING RECORDED THEREON PROCESSING PROGRAM FOR CONTROLLING THE GAME SYSTEM

(75) Inventors: Nobuhiro Suga, Tokyo (JP); Kensuke Yoshitomi, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/880,909

(22) Filed: Jun. 15, 2001

(65) Prior Publication Data

US 2002/0004420 A1 Jan. 10, 2002

(30) Foreign Application Priority Data

Jul. 10, 2000 (JP) .................................... P.2000-207621

(51) Int. Cl.[7] ............................................... A63F 13/00
(52) U.S. Cl. ........................ 463/7; 84/477 R; 463/37; 463/43
(58) Field of Search ............................ 463/43, 44, 35, 463/30, 36, 37, 9, 7; 84/470 R, 477 R, 478

(56) References Cited

U.S. PATENT DOCUMENTS

| | | | | |
|---|---|---|---|---|
| 4,416,182 A | * | 11/1983 | Wise et al. | 84/470 |
| 5,270,475 A | | 12/1993 | Weiss et al. | |
| 5,488,196 A | * | 1/1996 | Zimmerman et al. | 84/612 |
| 5,769,719 A | * | 6/1998 | Hsu | 463/37 |
| 5,859,382 A | | 1/1999 | Funaki | |
| 5,955,692 A | * | 9/1999 | Hayashi | 84/609 |
| 6,025,550 A | * | 2/2000 | Kato | 84/464 A |
| 6,031,174 A | * | 2/2000 | Takabayashi | 84/609 |
| 6,066,791 A | * | 5/2000 | Renard et al. | 84/477 |
| 6,347,998 B1 | * | 2/2002 | Yoshitomi et al. | 463/42 |
| 6,348,648 B1 | * | 2/2002 | Connick, Jr. | 84/477 R |
| 6,365,814 B1 | * | 4/2002 | Matsuda | 84/477 |
| 6,380,474 B2 | * | 4/2002 | Taruguchi et al. | 84/612 |
| 6,388,181 B2 | * | 5/2002 | Moe | 84/477 R |
| 6,390,923 B1 | * | 5/2002 | Yoshitomi et al. | 463/43 |
| 6,425,822 B1 | * | 7/2002 | Hayashida et al. | 463/7 |
| 6,495,747 B2 | * | 12/2002 | Shimaya et al. | 84/477 R |
| 6,504,090 B2 | * | 1/2003 | Tsai et al. | 84/615 |
| 6,541,692 B2 | * | 4/2003 | Miller | 84/634 |

FOREIGN PATENT DOCUMENTS

EP 0 903 169 A2 3/1999

* cited by examiner

*Primary Examiner*—Michael O'Neill
(74) *Attorney, Agent, or Firm*—Sughrue Mion, PLLC

(57) ABSTRACT

To enable mark-up (i.e., scoring) of improvised (i.e., ad-libbed) musical performance and enable a player to enjoy performance with a degree of freedom in accordance with a performance instruction, a CPU (10) marks up improvised musical performance provided by a player using an actual keyboard (90) (step S920). Hence, a player accustomed to playing a keyboard (80) can be satisfied sufficiently.

22 Claims, 8 Drawing Sheets

FIG. 5
| DATA NUMBER | CHORD PROGRESSION DATA |
|---|---|
| 1 | a → b → c → d · · · · · · |
| ⋮ | ⋮ |
500
FIG. 6
| DATA NUMBER | TIMING DATA |
|---|---|
| 1 | t1, t2, t3, t4, t5, t6, t7 |
| ⋮ | ⋮ |
600
FIG. 7
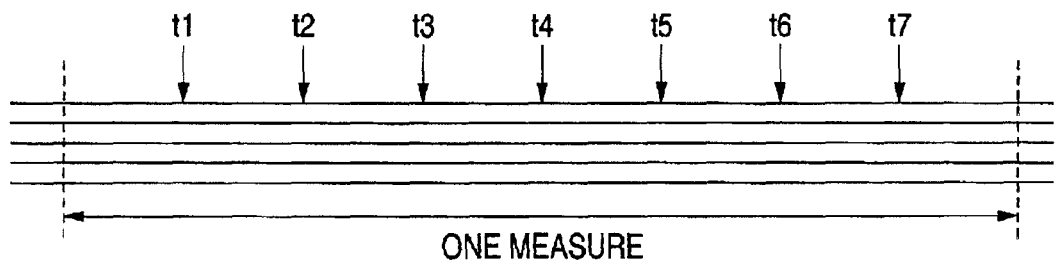
ONE MEASURE
FIG. 8
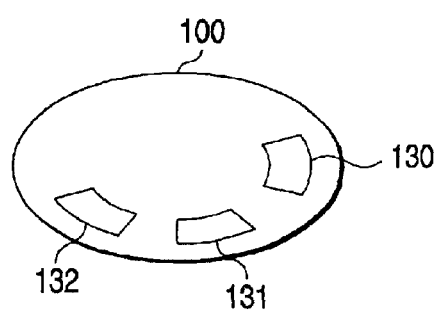

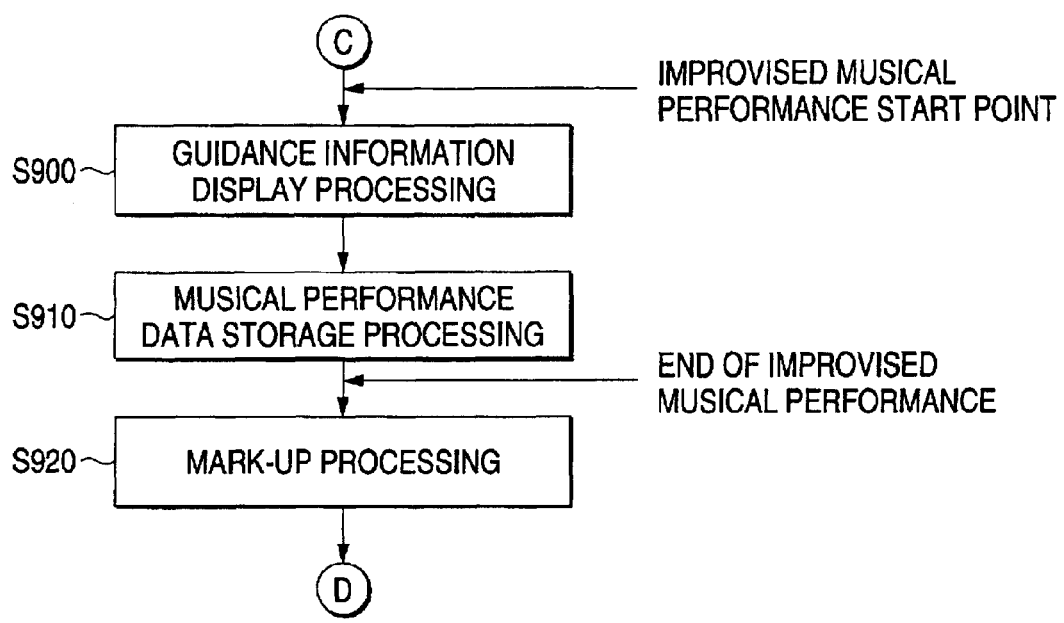
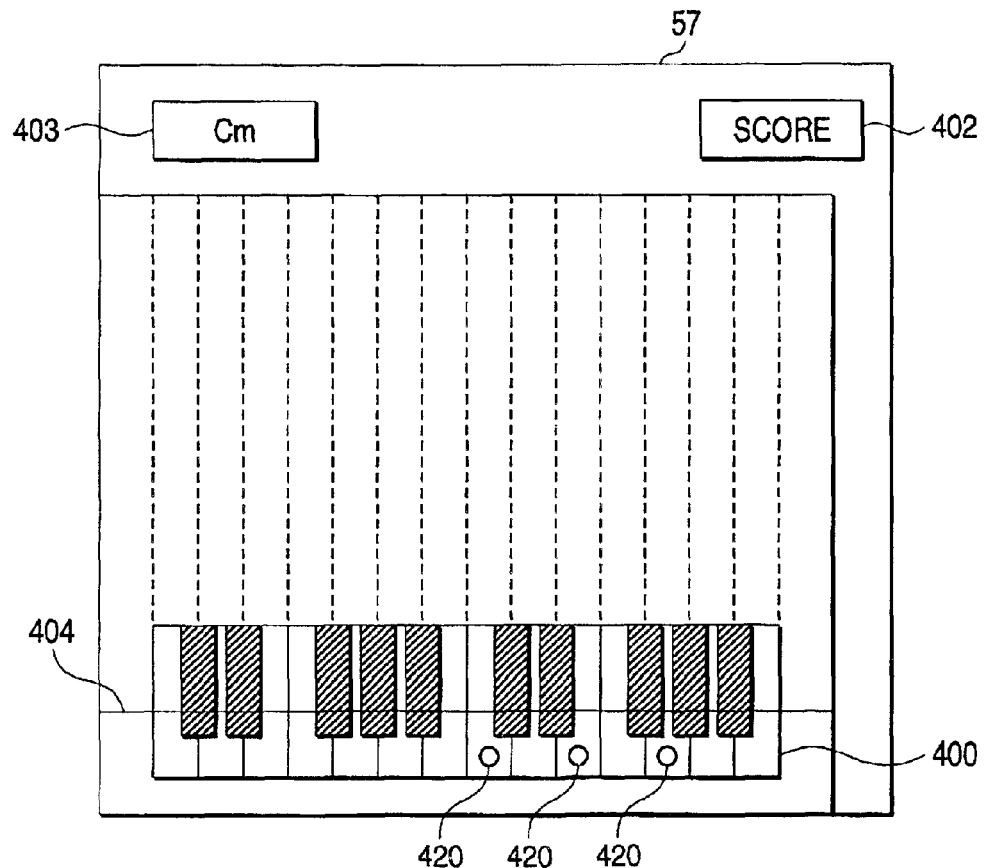

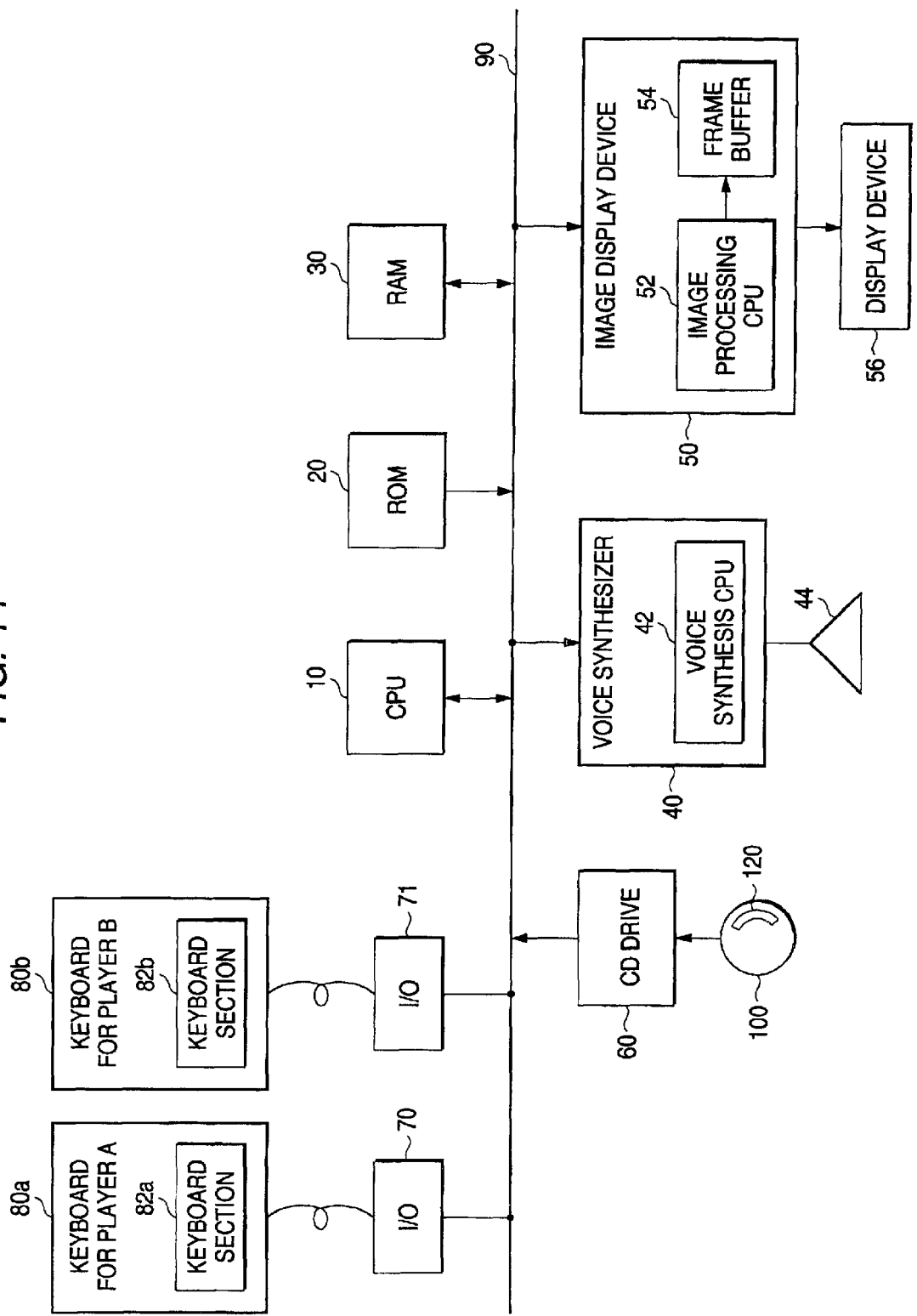

MUSICAL VIDEO GAME SYSTEM, AND COMPUTER READABLE MEDIUM HAVING RECORDED THEREON PROCESSING PROGRAM FOR CONTROLLING THE GAME SYSTEM

BACKGROUND OF THE INVENTION

1. Field of the Invention

The present invention relates to a game system for effecting a game which evaluates the accuracy of operation performed by a player when the player actually operates a performance operation instrument in accordance with an operation instruction imparted to an image appearing on the performance operation instrument. The present invention also relates to a recording medium, such as a computer readable medium, having recorded thereon a processing program for controlling operation of the game system.

The present application is based on Japanese Patent Application No. 2000-207621, which is incorporated herein by reference.

2. Description of the Related Art

One game having recently been in vogue is a game which enables a player to perform a game through use of a performance operation instrument; e.g., a keyboard etc. In a game of the type, a display image of a keyboard appears on a game display screen. Operation instructions pertaining to the keyboard display image are given to the player one after another. The player performs a key operation of a real keyboard connected to a game system main unit so as to accurately follow the operation instruction. The accuracy of operation is evaluated. The player is involved in playing the game so as to improve the evaluation.

Indeed, a player—who has no experience in playing a musical instrument and plays a musical instrument only at the time of playing a game—inadvertently becomes engrossed in playing the game. However, a player who has experience in musical performance and consider himself to enjoy creative performance, such as improvised (i.e., ad-libbed) performance, as well as a game—feels wanting of more than accurate performance in accordance with an operation instruction.

SUMMARY OF THE INVENTION

The present invention relates to a solution which has been conceived to solve a drawback of such a related-art game. Thus, the present invention is aimed at providing a game system which enables a player to enjoy improvised performance for obviating a feeling of wanting more and markup (i.e., score) the improvised performance. Further, the present invention is aimed at providing a recording medium, such as a computer readable medium, having recorded thereon a processing program for controlling the game system.

The present invention is also aimed at providing a game system which enables marking of improvised duet performance for obviating a feeling of wanting more. In this regard, the present invention is also aimed at providing a recording medium, such as a computer readable medium, having recorded thereon a processing program for controlling the game system.

To achieve the above object, according to a first aspect of the present invention, there is provided a game system which enables a player to play a game for evaluating accuracy of operation performed when the player has operated an actual performance operation instrument in accordance with an operation instruction given for a display image of performance operation instrument appearing on a game display screen. The game system comprises a mark-up processing device which marks up an improvised musical operation which is played with a degree of freedom of performance by the player through use of the actual performance operation instrument in accordance with a performance operation instruction.

In accordance with the first aspect of the present invention, the mark-up processing device marks up the improvised performance provided by a player through use of an actual performance operation instrument, and hence the player can enjoy free performance. Thus, even a player who has experience of musical performance can sufficiently enjoy a game.

According to a second aspect of the present invention, the mark-up processing device may mark up the improvised musical performance on the basis of a progression of musical chords of the improvised musical performance of the player. At this time, according to a third aspect of the present invention, preferably, the mark-up processing device effects mark-up operation such that evaluation of the player is increased every time a match between a progression of the musical performance chords and a progression of a plurality of preset mark-up reference chords is found. In accordance with the third aspect of the present invention, improvised musical performance can be marked up in accordance with progression of musical chords. Further, according to a fourth aspect of the present invention, preferably, a progression of the mark-up reference chords is memorized in a form of a table. In accordance with the fourth aspect of the present invention, setting of a progression of mark-up reference chords can be readily changed by way of rewriting the table.

According to a fifth aspect of the present invention, the mark-up processing device may mark up the improvised musical performance on the basis of musical performance timing of the improvised musical performance of the player. At this time, according to a sixth aspect of the present invention, preferably, the mark-up processing device effects mark-up operation such that evaluation of the player is increased every time a match between the musical performance timing and a plurality of preset mark-up reference timings is found. In accordance with the sixth aspect of the present invention, improvised musical performance can be marked up in accordance with musical performance timing. Further, according to a seventh aspect of the present invention, preferably, the mark-up reference timings are memorized in a form of a table. In accordance with the seventh aspect of the present invention, setting of a progression of mark-up reference chords can be readily changed by way of rewriting the table. Moreover, according to an eighth aspect of the present invention, the mark-up processing device may mark up the improvised musical performance on the basis of a progression of musical performance chords and musical performance timing of the improvised musical performance of the player.

According to a ninth aspect of the present invention, the game system may further comprise a guidance information display device which displays guidance information for the improvised musical performance of the player. In accordance with the ninth aspect of the present invention, improvised musical performance of a player can be supported. According to a tenth aspect of the present invention, the guidance information display device may change the display image of a performance operation instrument such that the player can understand details of operation to be performed in accordance with a progression in a musical composition which is an object of improvised musical performance. Alternatively, according to an eleventh aspect of the present invention, the guidance information display device may display a musical score such that the player can ascertain the position of an improvised musical performance in a musical score of a musical composition which is an object of improvised musical performance. Alternatively, according to a twelfth aspect of the present invention, the guidance information display device may display a correct progression of chords of a musical composition which is an object of improvised musical performance.

Furthermore, to achieve the above object, according to a thirteenth aspect of the present invention, there is provided a game system which enables players to play a game for evaluating accuracy of operations performed when the players have operated actual performance operation instruments in accordance with operation instructions given for a display image of performance operation instrument appearing on a game display screen. The game system comprises a mark-up processing device which marks up an improvised duet musical operation which is played with a degree of freedom of performance by the players through use of the actual performance operation instruments in accordance with performance operation instruction.

In accordance with the thirteenth aspect of the present invention, the mark-up processing device marks up improvised duet musical performance provided by a plurality of players through use of a plurality of actual performance operation instruments. Thus, the players can enjoy free musical performance. Further, players who have experience of musical performance can feel entertainment of duet performance.

According to a fourteenth aspect of the present invention, the mark-up processing device may give a player a low evaluation when a time required for playing improvised musical performance played by the player fails to fall within a permissible improvised musical performance time preset for each player. According to a fifteenth aspect of the present invention, the game system may further comprise a mark-up result display device which displays mark-up results such that each of the players can ascertain mark-up results thereof through comparison. In accordance with the fifteenth aspect of the present invention, comparison between mark-up results of the players can be made readily.

Moreover, to achieve the above object, according to a sixteenth aspect of the present invention, there is provided a computer readable medium having recorded thereon a processing program to be used for controlling operation of a game system which enables a player to play a game for evaluating accuracy of operation performed when the player has operated an actual performance operation instrument in accordance with an operation instruction given for a display image of performance operation instrument appearing on a game display screen. The processing program comprises a mark-up processing routine for marking up an improvised musical operation which is played with a degree of freedom of performance by the player through use of the actual performance operation instrument in accordance with a performance operation instruction. In accordance with the sixteenth aspect of the present invention, the improvised performance provided by a player through use of an actual performance operation instrument is marked up in accordance with the program executed by a computer. Therefore, the player can enjoy free performance. Thus, even a player who has experience of musical performance can sufficiently enjoy a game.

According to a seventeenth aspect of the present invention, the mark-up processing routine may include marking up of the improvised musical performance on the basis of a progression of musical chords of the improvised musical performance of the player. According to an eighteenth aspect of the present invention, the mark-up processing routine may include marking up of the improvised musical performance on the basis of musical performance timing of the improvised musical performance of the player. According to a nineteenth aspect of the present invention, the mark-up processing routine may include marking up of the improvised musical performance on the basis of a progression of musical performance chords and musical performance timing of the improvised musical performance of the player. According to a twentieth aspect of the present invention, the processing program may further comprise a processing routine for displaying guidance information for the improvised musical performance of the player. In accordance with the twentieth aspect of the present invention, the players can obtain guidance information.

Moreover, to achieve the above object, according to a twenty-first aspect of the present invention, there is provided a computer readable medium having recorded thereon a processing program to be used for controlling the operation of a game system which enables players to play a game for evaluating accuracy of operations performed when the players have operated actual performance operation instruments in accordance with operation instructions given for a display image of performance operation instrument appearing on a game display screen. The processing program comprises a mark-up processing routine for marking up an improvised duet musical operation which is played with a degree of freedom of performance by the players through use of the actual performance operation instruments in accordance with performance operation instruction. In accordance with the twenty-first aspect of the present invention, the improvised duet musical performance provided by a plurality of players through use of a plurality of actual performance operation instruments is marked up in accordance with the program executed by a computer. Therefore, the players can enjoy free performance. Thus, even players who have experience of musical performance can feel entertainment of duet performance.

According to a twenty-second aspect of the present invention, preferably, the mark-up processing routine results low evaluation of a player when a time required for playing improvised musical performance played by the player fails to fall within a permissible improvised musical performance time preset for each player.

It should be noted that the aforementioned computer readable medium may include recording mediums which enable recording and reading of digital contents. More specifically, such the computer readable medium include, for example, semiconductor recording mediums such as a ROM (i.e., Read Only Memory), a semiconductor IC (i.e., Integrated Circuit), etc., optical recording mediums such as a DVD-ROM (i.e., Digital Versatile Disk-Read Only Memory), a CD-ROM (i.e., Compact Disc-Read Only Memory), etc., magnetic recording mediums such as a flexible disk etc., and magneto-optical recording mediums such as an MO (i.e., Magneto Optical Disk) etc.

BRIEF DESCRIPTION OF THE DRAWINGS

The above and other objects and advantages of the present invention will become more apparent by describing in detail preferred embodiments thereof with reference to the accompanying drawings, wherein:

FIG. 5 is a descriptive view showing a chord progression data table 500;

FIG. 6 is a descriptive view showing a timing data table 600;

FIG. 7 is a descriptive view showing timing data;

FIG. 8 is a schematic descriptive view showing a recording area of the CD-ROM 100;

FIG. 9 is a descriptive view for explaining the operation of the game system of the embodiment according to the present invention;

FIG. 10 is a descriptive view showing a display screen on the display device 56 for explaining the outline of operation of the game according to the present invention;

FIG. 14 is a block diagram showing hardware configuration of a game system of another embodiment according to the present invention;

DETAILED DESCRIPTION OF THE PREFERRED EMBODIMENTS

Preferred embodiments of the present invention now will be described hereinbelow with reference to the accompanying drawings. First, the configuration of a game system according to embodiments of the present invention will be described.

1. Configuration

Figure 1:
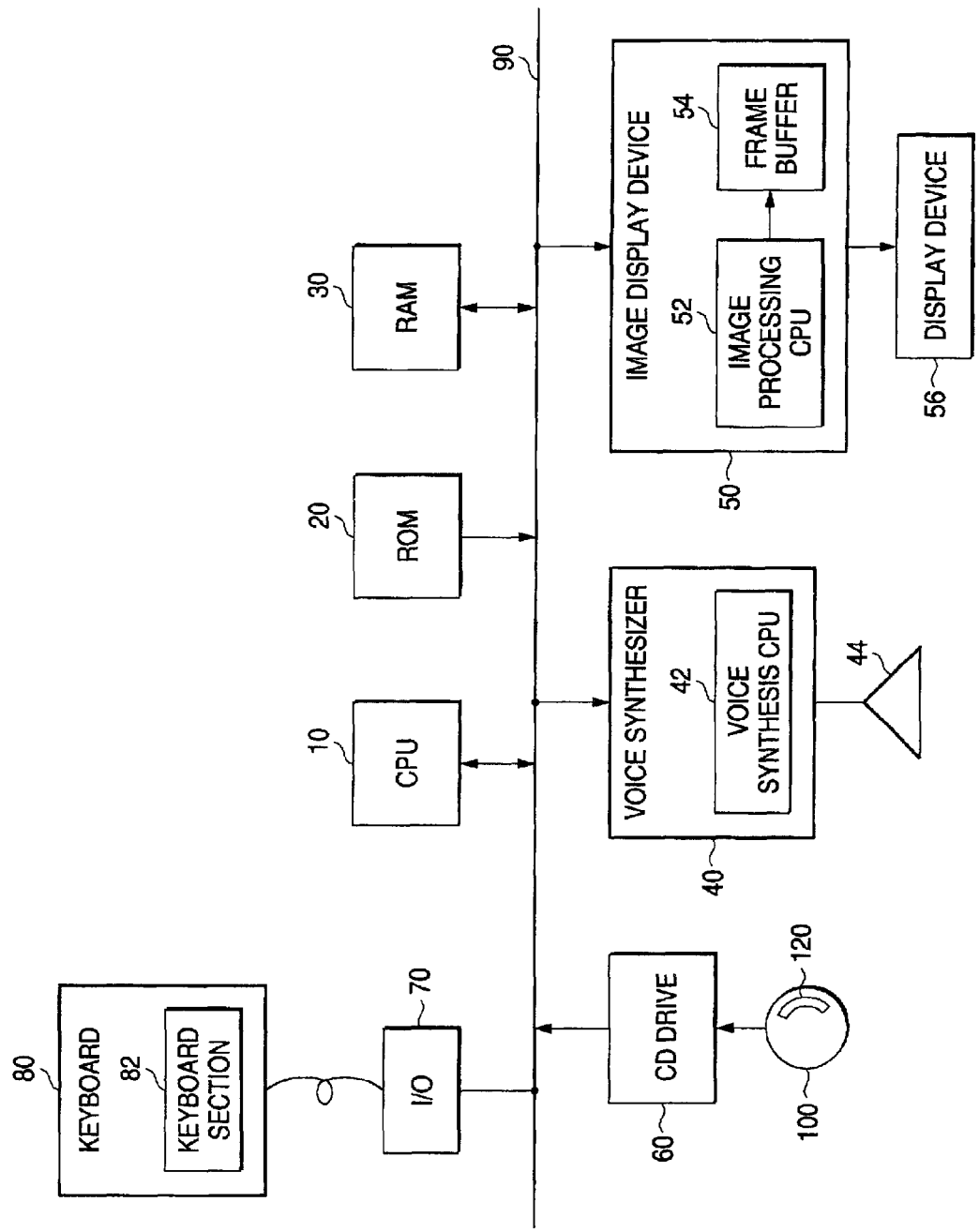
FIG. 1 is a block diagram showing hardware configuration of a game system of an embodiment according to the present invention.
Figure 2:
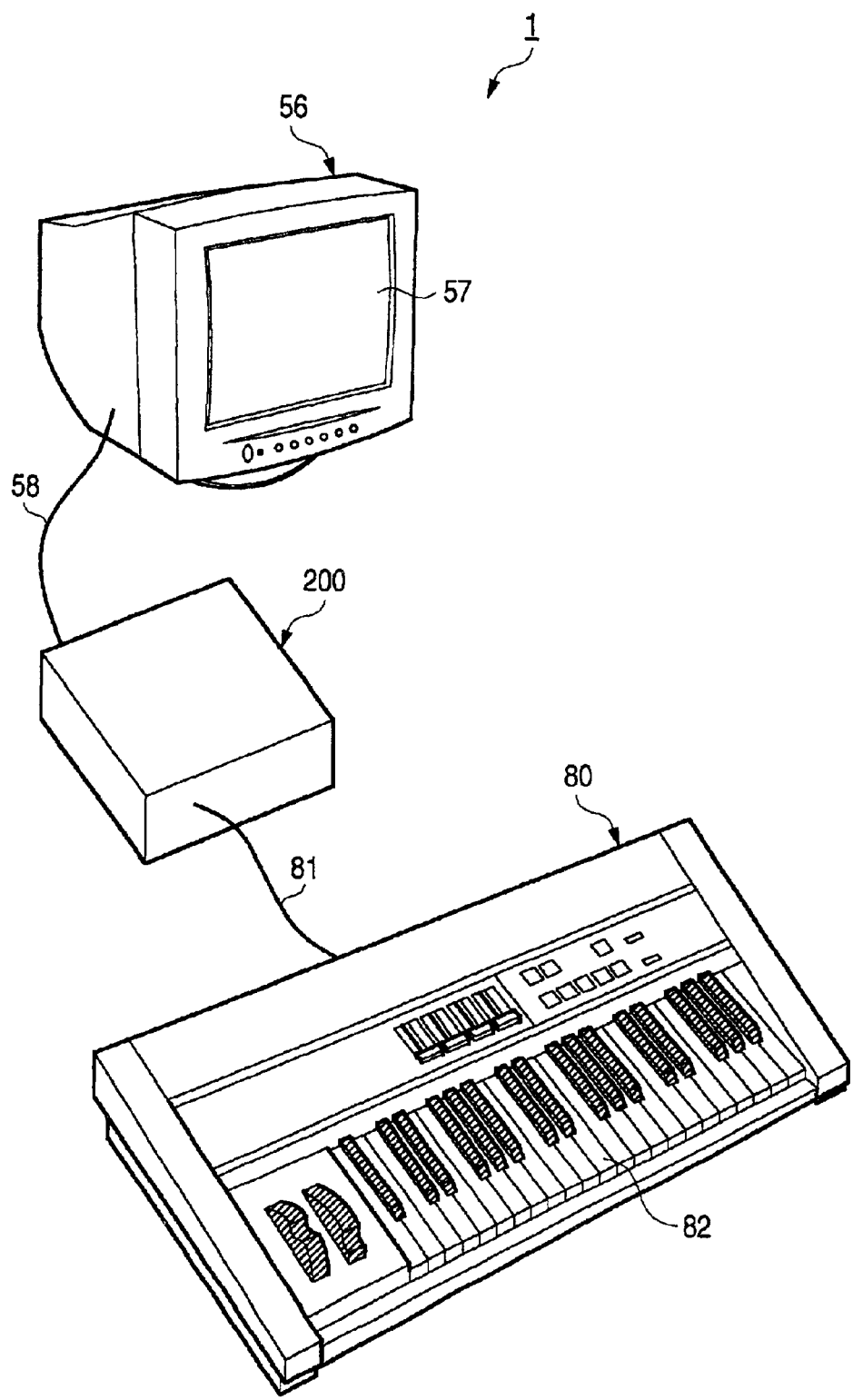
FIG. 2 is an external view showing the game system.

FIG. 2 is an external view of a game system 1, and FIG. 1 is a hardware block diagram of the game system. The game system 1 comprises a game system main unit 200; a display device 56 which is connected to the game system main unit 200 by way of a cable 58 and has a display area 57; and a keyboard 80 which is connected to the game system main unit 200 by way of a cable 81 and has a keyboard section 82.

The game system main unit 200 comprises a CPU 10 for controlling operation of the overall game system 1; ROM 20 having recorded thereon basic software (OS); RAM (i.e., Random Access Memory) 30 having a work area; a voice synthesizer 40; an image display device 50; a CD drive 60; and a keyboard 80 connected to the game main unit 200 by way of an I/O interface 70. These construction sections are connected to a bus 90 so as to be able to mutually exchange required information.

The voice synthesizer 40 has a voice synthesis CPU 42, and the voice synthesis CPU 42 is configured to output, from a loudspeaker 44, a sound effect corresponding to a voice output control signal transmitted from the CPU 10.

The image display device 50 has an image processing CPU 52 and a frame butter 54 and is connected to a display device 56 embodied as a home TV set. The image processing CPU 52 de-archives image data corresponding to the display control signal transmitted from the CPU 10 into the frame buffer 54, so that a desired image display appears on a display area 57 of the display device 56.

A game program 120 to be used for controlling operation of the game system 1 is recorded in a memory location of a CD-ROM (i.e., computer readable medium) 100. When the CD-ROM 100 is loaded into a CD-ROM driver 60, the CPU 10 performs operation in compliance with the OS recorded in the ROM 20, loads the game program 120 read by the CD-ROM driver 60, and de-archives the thus-loaded game program 120 in the RAM 30.

As shown in FIG. 8, in the present embodiment, a table recording area 131 and a musical composition data recording area 132 are formed on the CD-ROM 100 in addition to a program recording area 130 for recording the game program 120. A table, which will be described later, is to be recorded in the table recording area 131, and musical composition data are to be recorded in the musical composition data recording area 132. The CPU 10 reads a table recorded in the table recording area 131 and musical composition data recorded in the musical composition data recording area 132. The thus-read table and data are de-archived in a predetermined area in the RAM 30.

The CPU 10 executes the game program 120 which has been de-archived in the RAM 30 in the manner as mentioned above. At this time, the CPU 10 sends a control signal to the voice synthesis CPU 42 or the rendering CPU 52, as required. On the basis of a received control signal, the voice synthesis CPU 42 performs a voice output control operation or the rendering CPU 52 performs a display control operation, thus effecting a round of control operations of the game system. The CPU 10 receives an operation signal entered by way of the keyboard 80 and sends a control signal to the voice synthesis CPU 42 or the image processing CPU 52, whereby operation control corresponding to the received signal is performed, as required. Thus, the game system performs a round of control operations.

General operations of a game of this type will next be described, and the principal characteristic of the present invention will next be described, thus facilitating comprehension of the present invention.

2. Description of General Operation

Figure 3:
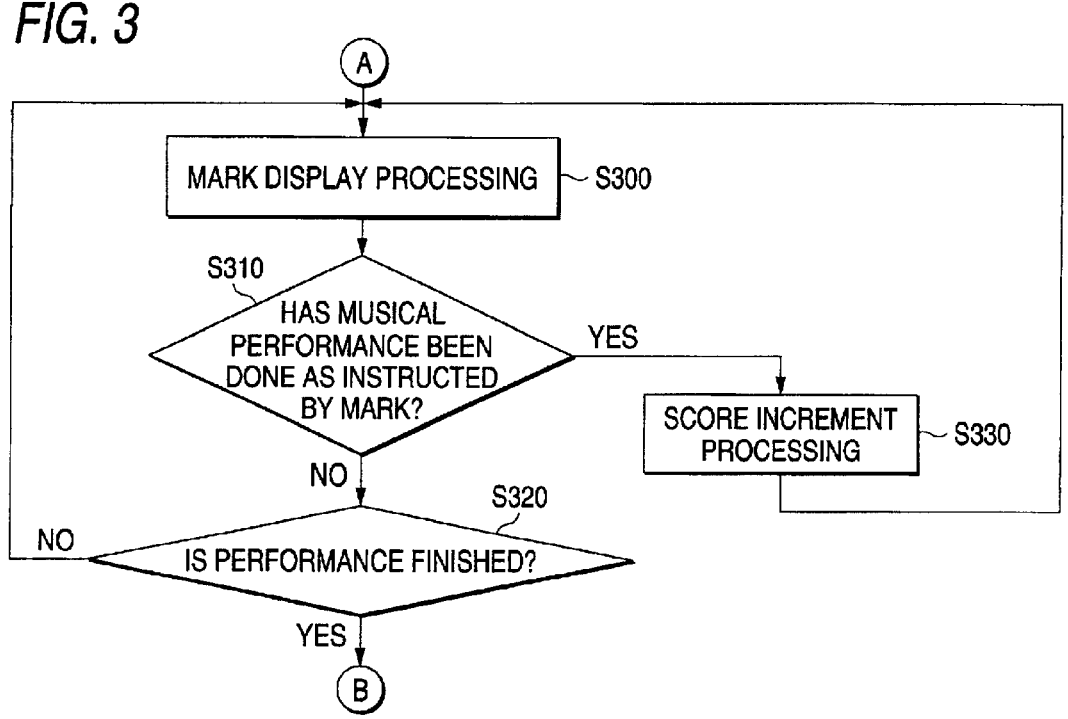
FIG. 3 is a flowchart for explaining the outline of operation of a game according to the embodiment.
Figure 4:
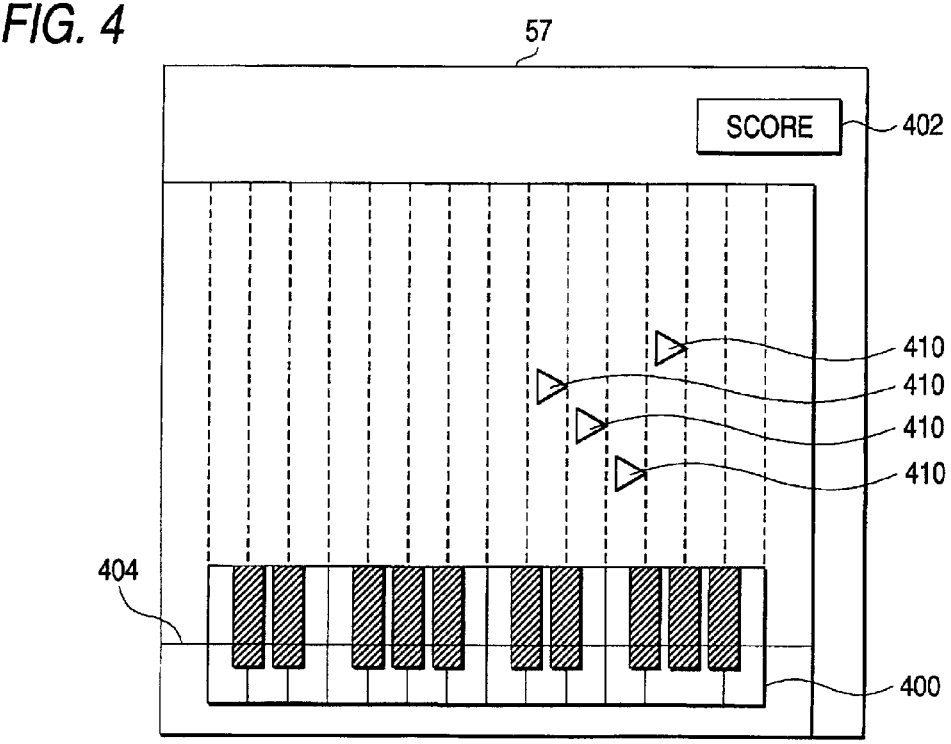
FIG. 4 is a descriptive view showing a display screen on a display device 56 for explaining the outline of operation of the game.

General operation of a game of this type will now be described with reference to FIGS. 3 and 4. First, The image processing CPU 52 displays, on the display area 57 of the display device 56, a keyboard display image 400 formed by taking the keyboard 80 as a display image; a reference line 404, which is a horizontal straight line crossing images of keys of the keyboard display image 40; and a score display area 402 for displaying a score assigned to a player.

The CPU 10 sends a display control signal to the image processing CPU 52, to thereby effect mark display processing (step S300). Triangular marks designated by reference numeral 410 shown in FIG. 4 are displayed so as to fall in sequence in the direction from top to bottom in the drawing. If the player has operated a corresponding key on the keyboard section 82 of the keyboard 80 when the mark 410 has arrived at the position of the reference line 404, the CPU 10 increments a score (in step S330) as the player has attained performance as instructed by the mark 410 (i.e., YES is selected in step S310). The result of the increment appears on the score display area 402.

When a key operation is not performed as instructed by the mark 410 (NO is selected in step S310), a score is not incremented. This game is continued (NO is selected in step S320) until the game becomes over (YES is selected in step S320). Thus, there is performed a game of evaluating the accuracy of operation performed when the player has played the keyboard 80 in accordance with an operation instruction imparted in the form of the marks 410 to the keyboard display image 400 appearing on the display area 57 as a game display screen.

In the present invention, the player enters not a game that is completely bound by these marks 410, but an improvised performance mode in which the player can perform with a certain degree of freedom in accordance with a performance operation instruction; e.g., a chord display, and the improvised performance is marked up.

3. First Embodiment

The principal characteristic of the present invention will next be described. Tables shown in FIGS. 5 and 6 are recorded in the table recording area 131 on the CD-ROM 100 shown in FIG. 8, and the tables are read by the CPU 10 and de-archived into a predetermined area on the RAM 30.

In a chord progression data table 500 shown in FIG. 5 are recorded data numbers and chord progression data serving as data pertaining to a progression of chords. In the example, chord progression data assigned data number "1" correspond to a→b→c→d. More specifically, "a," "b," "c," and "d" correspond to musical chords (CHORD) such as Cm or C7. A plurality of sets of representative chord progression data (reference chord progression data) are stored in the table. Since the chord progression data are stored in the form of a table, setting of the reference chord progression data can be changed readily by way of rewriting data.

In a timing data table 600 shown in FIG. 6 are recorded data numbers and timing data that are correlated with each other. In the example, timing data pertaining to data number "1" correspond to "t1," "t2," "t3," "t4," "t5," "t6," and "t7." FIG. 7 is a descriptive view of timing data. Timing data represent timings at which a key is to be operated, provided that a measure is divided into 8 segments. A key is to be operated after lapse of time t1 from the start of a measure, and another key is to be operated after lapse of time t2. If keys are operated at these timings, the player is determined to have provided musical performance in exact timing. Thus, exemplary timing data (reference timing data) are stored in the form of a table, and hence setting of reference timing data can be changed readily by way of rewriting data.

In the musical composition data recording area 132 shown in FIG. 8 are recorded all information items (musical composition data) pertaining to a required musical composition, such as musical note data, musical scale data, chord data, and chord progression data pertaining to a piece of music to be used in a game.

When the CPU 10 issues a game start instruction while having read the game program, a table, and musical composition data from the CD-ROM 100 and de-archiving the program, table, and musical composition data in the RAM 30, the game is executed. A game operation, which is the principal characteristic of the present invention, is performed, and improvised performance can be started. The example operation will now be described on the basis of the assumption that musical performance is provided with use of only a player's right hand.

When improvised musical performance is commenced, the CPU 10 displays, on the display area 57, guidance information which is improvised musical performance operation guide information for a player (step S900). FIG. 10 is a descriptive view showing an example of guidance information. The CPU 10 sequentially reads musical scale data of musical composition data and sequentially adds guidance marks 420 to a keyboard display image 400 until the improvised musical performance ends, in order to inform the player of a keyboard operation pattern corresponding to musical composition data. Another conceivable method other than addition of the guidance marks 420 is to display a key as if it were glowing.

The player sequentially provides improvised musical performance by way of operating keys with his one hand in accordance with guidance. The CPU 10 sequentially stores, as musical performance data and in a predetermined area on the RAM 30, data representing musical scale data and data pertaining to key operation timings (step S910).

Figure 13A:
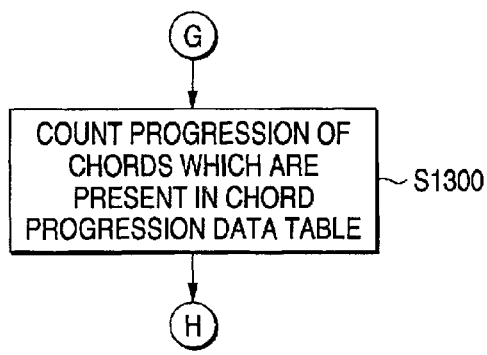
FIGS. 13A and 13B are descriptive views showing mark-up processing operation.

When improvised musical performance is completed, the CPU 10 marks up the improvised performance (step S920). FIG. 13A shows a result of first mark-up operation. When the CPU 10 executes processing pertaining to step S1300, musical scale data pertaining to the musical performance data having been stored in the RAM 30 beforehand are sequentially ascertained. Musical performance data whose progression of musical performance chords matches the chord progression data stored in the chord progression data table 500 are detected and counted. The CPU 10 takes as a score, for example, a counted value or a product formed by multiplying a counted value by a predetermined number, and displays the thus-produced score in the score display area 402 in the display area 57.

Thus, the improvised performance of the player can be marked up on the basis of a progression of musical performance chords by the mark-up operation of the CPU 10. In the example, the CPU 10 effects counting every time a match exists between the musical performance data and a plurality of preset mark-up reference chords (i.e., a plurality of chord progress data stored in the chord progress data table 500), in terms of a progression of musical performance chords. The improvised musical performance is marked up while a counted value is taken as a score. Thus, an improvised musical performance can be marked in accordance with a progression of musical chords.

Figure 13B:
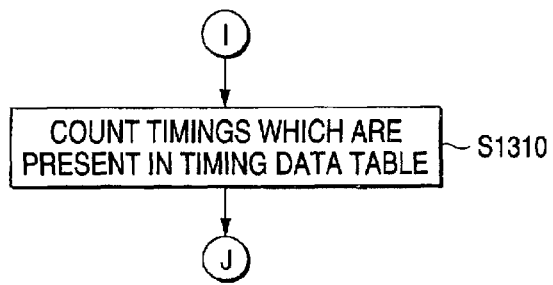

FIG. 13B shows a second mark-up operation. When the CPU 10 performs processing pertaining to step S1310, timing data pertaining to key operations (i.e., key operation timing data) stored in the RAM 30 are sequentially ascertained. A match in performance timing between the key operation timing data and the timing data stored in the timing data table 600 is detected and counted. The CPU 10 takes as a score, for example, a counted value or a product formed by multiplying a counted value by a predetermined number. The score is displayed on the score display area 402 in the display area 57.

A player's improvised performance can be marked on the basis of musical performance timings by a mark-up operation of the CPU 10. In this example, the CPU 10 effects counting every time a match exists between the key operation timing data and a plurality of preset mark-up reference timings (i.e., a plurality of timing data sets stored in the timing data table 600). The improvised musical performance is marked up while a counted value is taken as a score. Thus, an improvised musical performance can be marked in accordance with a progression of musical chords.

The mark-up operations shown in FIGS. 13A and 13B may be adopted independently or in combination. Alternatively, a player may play chords with his left hand (in accordance with an operation instruction) and play a melody with his right hand through use of two keyboards (each keyboard has up to two octaves) or one keyboard having two octaves or more. At this time, the CPU 10 may mark up the performance by the left hand in terms of a progression of chords and/or mark up the performance by the right hand in terms of timing.

When a melody is played with an octave (e.g., when two "do" notes of different octaves are played simultaneously), performance may be marked up so as to provide a point value twice that given when a melody is played with a single sound. Even when musical performance has been provided with a octave rendition, the CPU 10 may mark up the performance by the left hand in terms of a progression of chords and/or mark up the performance by the right hand in terms of timing.

As another method of displaying guidance information in step S900 shown in FIG. 9, the CPU 10 may sequentially read chords provided in the musical composition data and display the thus-read chords in a chord display area 430 (see FIG. 10).

Figure 11:
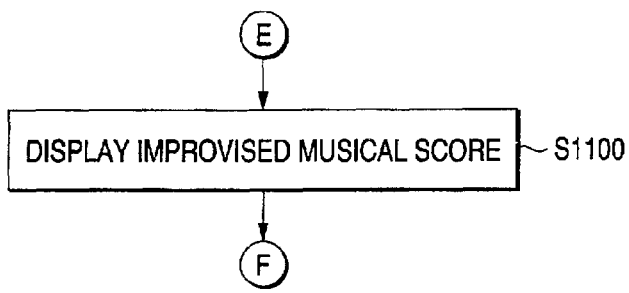
FIG. 11 is a descriptive view for explaining the operation of an example of guidance information display.
Figure 12:
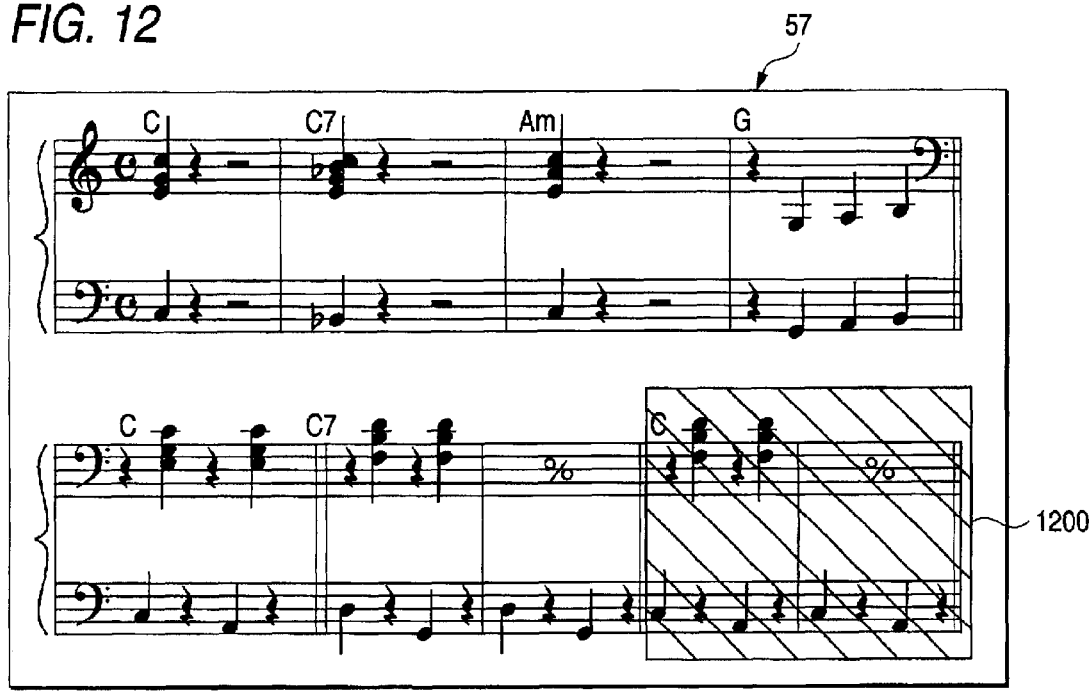
FIG. 12 is a descriptive view for explaining an example of guidance information display.

As described in connection with step S1100 shown in FIG. 11, an improvised music score information display is mentioned as still another example for displaying guidance information. As shown in FIG. 12, prior to starting improvised musical performance, the CPU 10 conspicuously highlights an improvised section 1200 in musical score data belonging to the musical composition data. As a result, a player can ascertain the start of improvised musical performance before providing the improvised musical performance. Highlighting is effected, by way of displaying a target area in a color different from that in which the other area is displayed.

In step S900, the CPU 10 displays guidance information and can support improvised performance of a player. One of the methods of displaying guidance information may be employed, or some of the methods may be employed simultaneously.

In the first embodiment mentioned previously, the CPU 10 marks up the improvised performance of a player using the keyboard 80, and hence the player can enjoy free performance. Thus, even a player who has experience of musical performance can sufficiently enjoy a game.

4. Second Embodiment

A second embodiment of the present invention is characterized in that an improvised duet musical performance is marked up. FIG. 14 is a block diagram showing a game system according to the second embodiment. In contrast with the game system shown in FIG. 1, the game system comprises a player A keyboard 80a which a player A uses for improvised musical performance and a player B keyboard 80a which a player B uses for improvised musical performance. In other respects, the game system is identical with that described in connection with the first embodiment.

Players A and B provide musical performance in accordance with the marks 410 described at the outset, from the beginning of a game until a predetermined period of time. Subsequently, when improvised duet musical performance is instructed by a message display (not shown), players A and B alternately provide improvised musical performance. In the example, a player performs one measure, and another player performs the next measure. In this way, two players perform free musical performance without being restricted by the marks 410, thus commencing improvised duet musical performance.

Figure 15:
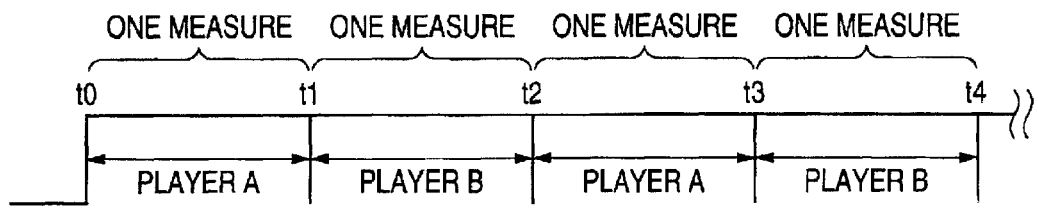
FIG. 15 is a descriptive view for explaining operation of the game system of FIG. 14.
Figure 16:
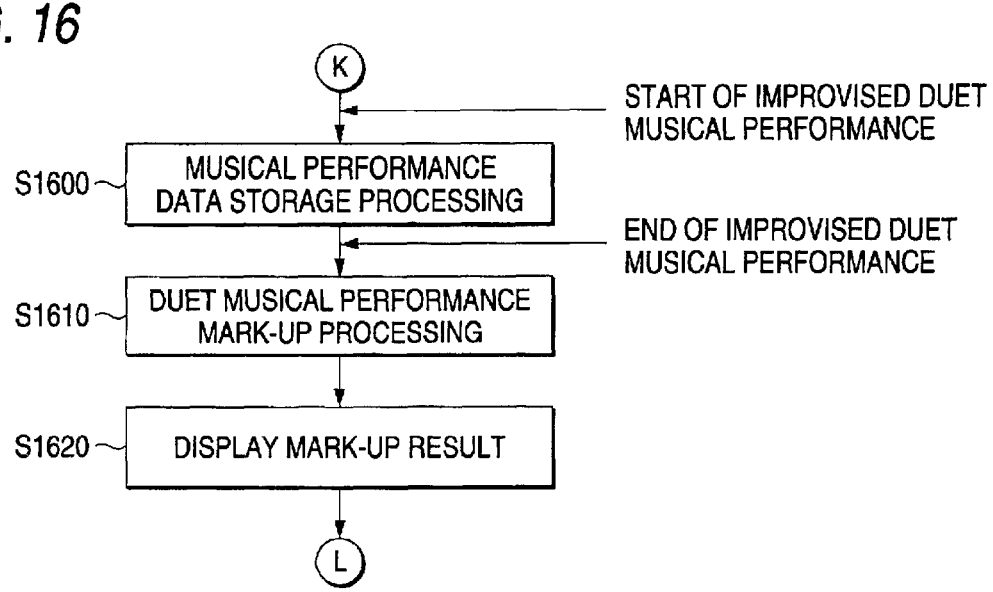
FIG. 16 a descriptive view for explaining operation of the game system of FIG. 14.
Figure 17:
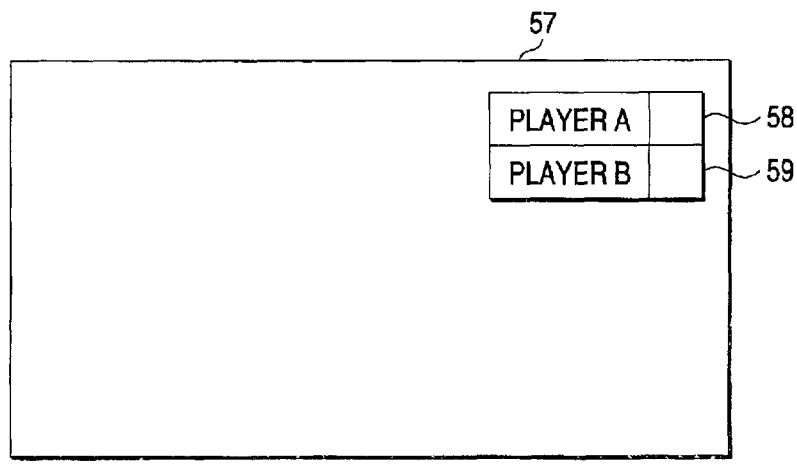
FIG. 17 is a descriptive view showing a display screen on the display device 56 for explaining the outline of operation of the game system of FIG. 14.

The CPU 10 stores musical performance data pertaining to one measure (i.e., a time required for playing one measure) (step S1600) for each player in a predetermined area of the RAM 30. Next, when the improvised duet musical performance is completed, the CPU 10 performs a mark-up operation (step S1610). FIG. 15 is a descriptive view showing a mark-up standard (time is plotted from left to right along a time axis). When player A and player B alternately provide improvised musical performance of one measure, player A must finish his performance between time t0 and t1. If player A has failed to finish his performance within the period of time, he receives a penalty point. Similarly, player B must finish his performance between time t1 and time t2. If player B has failed to finish his performance, he receives a penalty point. If a permissible time is exceeded, a player receives a penalty point.

The CPU 10 loads musical performance data stored in the RAM 30 for each player. With reference to the mark-up standard shown in FIG. 15, the CPU 10 determines whether or not improvised performance of player A falls within a permissible period of time. If the performance exceeds the permissible period of time several times, player A receives penalty points equal to the number of times performance has exceeded the permissible period of time. Similarly, a determination is made to whether or not improvised performance of player B falls within a permissible period of time. If the performance exceeds the permissible period of time several times, player B receives penalty points equal to the number of times performance has exceeded the permissible period of time.

In step S1620, the CPU 10 displays, in an area 58, a result of mark-up of improvised musical performance of player A. Further, the CPU 10 displays, in an area 59, a result of mark-up of improvised musical performance of player B.

According to the second embodiment, the CPU 10 marks up the improvised duet musical performance by players A and B using two keyboards (the keyboards 80i aand 80b). Hence, the players can enjoy free musical performance. Even experienced players can enjoy entertainment of a duet.

When improvised duet musical performance has failed to end within a permissible improvised performance time previously set for each player, the CPU 10 can mark up a player by giving him a penalty point. Further, since the CPU 10 displays a score of player A in the area 58 and a score of player B in the area 59 such that the scores of players A and B can be compared with each other, comparison between scores of players is facilitated. The CPU 10 performs a mark-up operation such that the shorter a duet time, the higher a score which is given when a hit is achieved.

The embodiments of the present invention have been described. The present invention is susceptible to various modifications and alterations within the scope of the invention. The performance operation instrument has been described in connection with the embodiments by way of taking a keyboard by way of an example. However, the musical performance instrument is not limited to a keyboard. Any stringed instrument capable of outputting a musical scale ranging from "do" to "do" in higher octave may be employed as a performance operation instrument. In the case of, for example, a guitar, a musical-tone detection sensor may be attached to a string. Alternately, a musical-tone detection sensor may be attached to a neck, and an output from the sensor may be input to the CPU 10 by way of an I/O interface. In this case, operations completely identical with those mentioned previously can be performed.

As has been described, the present invention yields an advantage of ability to provide sufficient satisfaction to a player who has experience in musical performance and considers to enjoy a creative phase of a game such as improvised musical performance, as well accurate operation following an operation instruction. Further, the present invention yields an advantage of ability to cause a player who has experience in musical performance to feel entertainment of duet musical performance.

It is contemplated that numerous modifications maybe made to the game system, and the computer readable medium having recorded thereon a processing program for controlling operation of the game system, of the present invention without departing from the spirit and scope of the invention as defined in the following claims.

What is claimed is:

1. A game system which enables a player to play a game for evaluating the accuracy of an operation performed when the player has operated an actual performance operation instrument in accordance with an operation instruction given in connection with a displayed image of a performance operation instrument appearing on a game display screen, the game system comprising:
   a mark-up processing device which marks up an improvised musical performance which is played with a degree of freedom of performance of said game by the player through use of the actual performance operation instrument in accordance with a performance operation instruction.

2. The game system of claim 1, wherein the mark-up processing device marks up the improvised musical performance on the basis of a progression of musical chords of the improvised musical performance of the player.

3. The game system of claim 2, wherein the mark-up processing device effects a mark-up operation such that evaluation of the player is increased every time a match between a progression of the musical performance chords and a progression of a plurality of preset mark-up reference chords is found.

4. The game system of claim 3, wherein a progression of the mark-up reference chords is stored in a form of a table.

5. The game system of claim 1, wherein the mark-up processing device marks up the improvised musical performance on the basis of musical performance timing of the improvised musical performance of the player.

6. The game system of claim 5, wherein the mark-up processing device effects mark-up operation such that evaluation of the player is increased every time a match between the musical performance timing and a plurality of preset mark-up reference timings is found.

7. The game system of claim 6, wherein the mark-up reference timings are stored in a form of a table.

8. The game system of claim 1, wherein the mark-up processing device marks up the improvised musical performance on the basis of at least one of a progression of musical performance chords and a musical performance timing of the improvised musical performance of the player.

9. The game system of claim 1, further comprising a guidance information display device which displays guidance information for the improvised musical performance of the player.

10. The game system of claim 9, wherein the guidance information display device changes the display image of a performance operation instrument such that the player can understand details of operation to be performed in accordance with a progression in a musical composition which is an object of improvised musical performance.

11. The game system of claim 9, wherein the guidance information display device displays a musical score such that the player can ascertain the position of an improvised musical performance in a musical score of a musical composition which is an object of improvised musical performance.

12. The game system of claim 9, wherein the guidance information display device displays a correct progression of chords of a musical composition which is an object of improvised musical performance.

13. A game system which enables a plurality of players to play a game for evaluating the accuracy of operations performed when the players have operated actual performance operation instruments in accordance with operation instructions given in connection with a displayed image of a performance operation instrument appearing on a game display screen, the game system comprising:
   a mark-up processing device which marks up an improvised duet musical performance said duet musical operation being playable with a degree of freedom of performance of said game by the players through use of the actual performance operation instruments in accordance with performance operation instruction.

14. The game system of claim 13, wherein the mark-up processing device gives a player a low evaluation when a time required for playing improvised musical performance played by the player fails to fall within a permissible improvised musical performance time preset for each player.

15. The game system of claim 14, further comprising a mark-up result display device which displays mark-up results such that each of the players can ascertain mark-up results thereof through comparison.

16. A computer readable medium having recorded thereon a processing program to be used for controlling operation of a game system which enables a player to play a game for evaluating the accuracy of an operation performed when the player has operated an actual performance operation instrument in accordance with an operation instruction given in connection with a display image of a performance operation instrument appearing on a game display screen, the processing program comprising:
   a mark-up processing routine for controlling a processor to mark up an improvised musical performance which is played with a degree of freedom of performance of said game by the player through use of the actual performance operation instrument in accordance with a performance operation instruction.

17. The computer readable medium of claim 16, wherein the mark-up processing routine includes marking up of the improvised musical performance on the basis of a progression of musical chords of the improvised musical performance of the player.

18. The computer readable medium of claim 16, wherein the mark-up processing routine includes marking up of the improvised musical performance on the basis of musical performance timing of the improvised musical performance of the player.

19. The computer readable medium of claim 16, wherein the mark-up processing routine includes marking up of the improvised musical performance on the basis of a progression of musical performance chords and musical performance timing of the improvised musical performance of the player.

20. The computer readable medium of claim 16, wherein the processing program further comprises a processing routine for displaying guidance information for the improvised musical performance of the player.

21. A computer readable medium having recorded thereon a processing program to be used for controlling the operation of a game system which enables a plurality of players to play a game for evaluating the accuracy of operations performed when the players have operated actual performance operation instruments in accordance with operation instructions given in connection with a display image of a performance operation instrument appearing on a game display screen, the processing program comprising:

a mark-up processing routine for controlling a processor to mark up an improvised duet musical performance which is played with a degree of freedom of performance of said game by the players through use of the actual performance operation instruments in accordance with performance operation instruction.

22. The computer readable medium of claim 21, wherein the mark-up processing routine results low evaluation of a player when a time required for playing improvised musical performance played by the player fails to fall within a permissible improvised musical performance time preset for each player.

* * * * *